E. R. POWELL.
WHEEL HARROW.

No. 109,754.  Patented Nov. 29, 1870.

WITNESSES.
Jas L Ewin
Wm H Brereton Jr

E. R. Powell
By Knight Bros
Attys

E. R. POWELL.
WHEEL HARROW.

No. 109,754. Patented Nov. 29, 1870.

WITNESSES:
Jas. L. Ewin
Wm. H. Burton Jr.

E. R. Powell
By Knight Bros
Attorneys

United States Patent Office.

EDWIN R. POWELL, OF JEFFERSONVILLE, VERMONT.

Letters Patent No. 109,754, dated November 29, 1870.

IMPROVEMENT IN WHEEL-HARROWS.

The Schedule referred to in these Letters Patent and making part of the same.

I, EDWIN R. POWELL, of Jeffersonville, in the county of Lamoille and State of Vermont, have invented an improved Wheel-Harrow, of which the following is a specification.

Nature and Objects of the Invention.

The machine adjusted for use consists of a sulky-frame, a low truck between the wheels of the same connected to it by a chain, and one of a set of drag-harrows, assorted as to form of wood and character of teeth, hinged at its front end to said truck, and connected at its rear end by a chain passing over suitably-arranged pulleys on the main frame to a hand-lever, by which it may be suspended clear of the ground, when desired.

The improvements consist—

First, in the employment, in connection with the sulky-frame, of the low truck attached by chains, and connected to the harrow by hinge-joint, and the chain-connection with the elevating-lever, whereby the harrow is rendered entirely free from vertical constraint in operation, while it is perfectly under the control of the driver.

Second, in a peculiar construction of the tooth.

Third, in a peculiar construction and relative arrangement of the parts of the frame.

Description of the Accompanying Drawing.

In all the figures like letters indicate corresponding parts.

Figure 1:
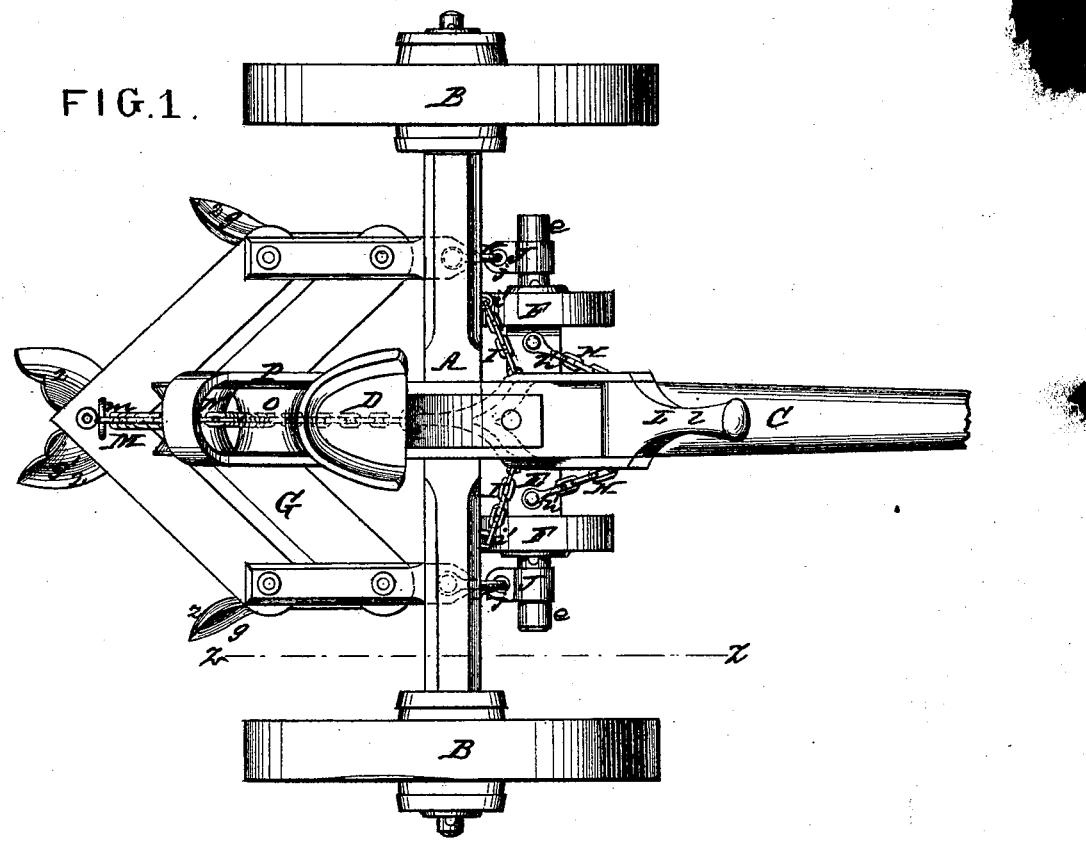
Figure 1 is a plan view of my improved machine in illustrative form.

General Description.

A in the drawing represents an axle-tree;

B B, wheels;

C, a rigid tongue; and

D, a driver's seat, (all of which parts may be of any usual construction,) constituting a sulky-frame, which is employed to drag and carry the harrow proper, as required.

E represents an axle-tree; and

F F, a pair of wheels, constituting a truck, which forms the medium of attachment and support for the front end of the harrow.

Figure 2:
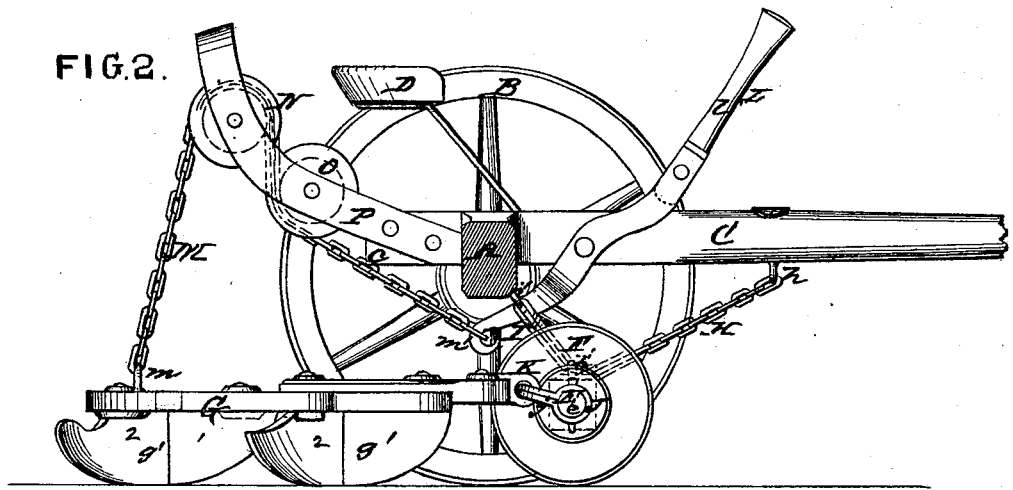
Figure 2 is a longitudinal section on the line $z$ $z$, fig. 1.
Figure 3:
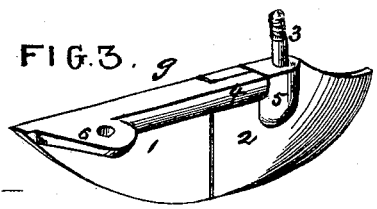
Figure 3 is a perspective view of the form of tooth, shown in figs. 1 and 2, detached.
Figure 4:
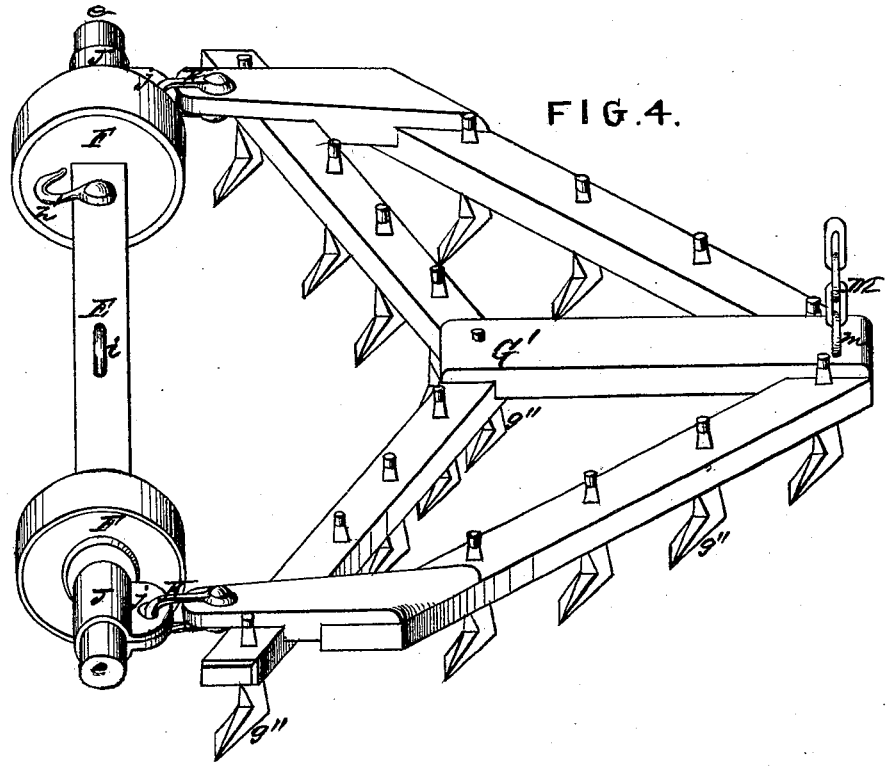
Figures 4 and 5 are perspective views of different forms of harrow proper from that shown in figs. 1 and 2.
Figure 5:
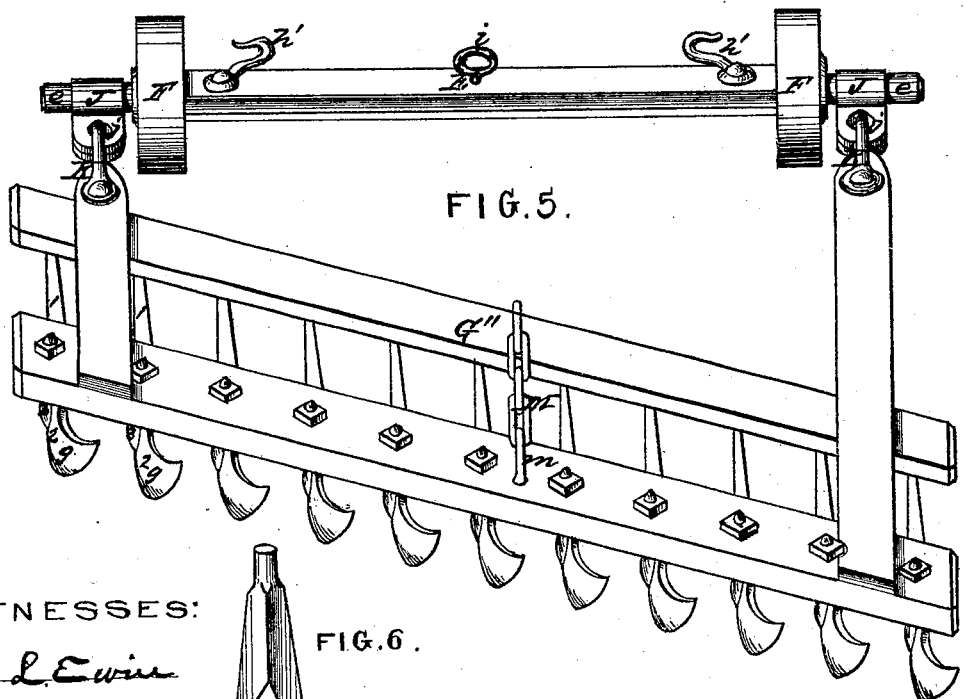
Figure 6:
Figure 6 is a perspective view of one of the teeth of the harrow, shown in fig. 4, detached.

G G' G'' represent different forms of harrow, either of which may be employed as occasion may require; and $g$ $g'$, figs. 1, 2, 3, and 5, and $g''$, figs. 4 and 6, the different teeth of the same.

H H are drag-chains attaching the truck axle E to the tongue C; and

I I, stay-chains from axle-tree A, to limit its lateral and forward movement relatively to the frame.

$e$ $e$ represent elongations of the spindles of the truck-axle E; and

J J, loose collars occupying the same, and provided with perforated lugs $j$.

K K are clevises on the harrow-wood, engaging with the perforated lugs $j$.

By these means a free double hinge-joint is formed between the said truck and the harrow.

L is a hand-lever for elevating the harrow.

M is a chain attaching the rear end of the harrow to the elevating-lever L.

N is a grooved pulley, affording the requisite elevated support for the chain M; and O, a supplementary one, reflexing the chain to the line of draft of the lower end of the lever L, to which the chain is attached.

$c$ represents a rearward extension of the tongue C; and

P, a curved U-shaped metallic bracket projecting upward from said extension, and providing bearings for the pulleys N O.

The teeth $g$, which form part of my improvements, consist of three parts, viz., a cast point, 1, a steel mold-board, 2, and a cast or wrought-iron bolt, 3, of the peculiar form represented in fig. 3.

An extension, 4, of a bracing-rib on the point 1, provided with one or more stud-bolts or rivets, unites the point and mold-board. The head 5 of bolt 3 is similarly provided and attached. The compound tooth is securely attached by the said bolt and an additional one passing through the perforated lug 6 on the point.

The steel mold-boards 2 occupy the positions where the principal friction and wear would otherwise occur, and remove nearly all liability to them, while their small size and simple form enable them to be added at a trifling additional first cost.

The points 1, if broken, can be cheaply replaced.

The double teeth $g'$ also have the cast points 1 and steel mold-boards 2, as indicated.

The chains H, I, and M, are each attached at one end by an eye-bolt or staple, $h$ $i$ $m$, and at the other by a hook, $h'$ $i'$ $m'$, to enable the ready detachment of the truck and harrow, when desired. The particular relative position of these staples and hooks is variable.

The lever L is furcated to embrace the tongue B, this portion being metallic, and a wooden handle, $l$, is secured between the furcate ends of the said metallic portion.

In practice, the number of the teeth of harrow G is multiplied.

Operation.

The harrow G, shown in figs. 1 and 2, is adapted for covering broadcast seed, turning the ground from each side to the center. That, G', shown in fig. 4, having the form of teeth shown in detail in fig. 6, is for pulverizing or mellowing the ground preparatory to planting, or for turning in broadcast seed. That, G", shown in fig. 5, which has the same form of teeth as G, is to operate similarly to the same, turning the ground all one way. Either is employed, as required.

In passing to and from the field, or when it is desired to throw the harrow out of action for any reason, the lever L is operated, which raises the rear end thereof, when the truck E F supports its front end.

For operation, the lever L being released, the harrow is relieved of vertical control.

Claims.

I claim as my invention—

1. The combination, with the sulky-frame A B C D and harrow proper G, of the truck E F, hinge-joints J j K, and chains H I M, constructed and arranged substantially as described and represented, for the purpose set forth.

2. The tooth g, composed of the cast point 1 4 6, steel mold-board 2, and bolt 3 5, constructed and arranged as represented and described, for the purposes set forth.

3. The axle-tree A, wheels B B, tongue C c, seat D, pulley-bracket P N O, and hand-lever L l, the whole constituting an improved sulky-frame, as constructed, combined, and arranged in the manner shown and described, for the purposes set forth.

EDWIN R. POWELL.

Witnesses:
A. C. FLETCHER,
ELIAS CHUCKWELL.